US007216880B2

(12) United States Patent
Laffin

(10) Patent No.: US 7,216,880 B2
(45) Date of Patent: May 15, 2007

(54) UNIVERSAL HANDLE AND BODY-SUPPORTING CHAIR UTILIZING SAME

(75) Inventor: Francois Xavier Laffin, Sion (CH)

(73) Assignee: LifeStand International SA, Sion (CH)

( * ) Notice: Subject to any disclaimer, the term of this patent is extended or adjusted under 35 U.S.C. 154(b) by 290 days.

(21) Appl. No.: 10/870,426

(22) Filed: Jun. 18, 2004

(65) Prior Publication Data

US 2005/0039302 A1 Feb. 24, 2005

(30) Foreign Application Priority Data

Jun. 19, 2003 (FR) .................................. 03 07408

(51) Int. Cl.
*B62M 1/14* (2006.01)

(52) U.S. Cl. .................... 280/250.1; 16/430; 280/650; 297/DIG. 10

(58) Field of Classification Search ............. 280/250.1, 280/304.1, 650; 16/426, 427, 429, 421, 444, 16/430; 297/DIG. 10, 316
See application file for complete search history.

(56) References Cited

U.S. PATENT DOCUMENTS 4,598,944 A 7/1986 Meyer et al.
4,623,194 A 11/1986 Pillot
5,108,202 A * 4/1992 Smith ......................... 297/330
5,867,910 A * 2/1999 Stegall et al. .............. 30/272.1
6,082,083 A * 7/2000 Stalpes et al. ............... 56/11.6
6,178,642 B1 * 1/2001 Schaer ........................ 30/216
6,244,662 B1 * 6/2001 Porcheron .................. 297/383

FOREIGN PATENT DOCUMENTS

DE 3610682 10/1997
EP 0622015 2/1994
GB 714300 8/1954

* cited by examiner

*Primary Examiner*—Anne Marie Boehler
(74) *Attorney, Agent, or Firm*—Dennison, Schultz & MacDonald

(57) ABSTRACT

A universal handle comprising a handle body having a U-shaped gripping zone (51), open at its center (52), having two arms (53) connected by a bar (54) offering, all three, a support back for the palm of the hand or the fingers of the user. The handle comprises in addition a control member:

which is arranged on the inside of the opening (52) of the gripping zone (51) of the body of the handle and open at its center in such a fashion as to comprise a U-shaped gripping zone corresponding to the gripping zone (51) of the handle and having two arms connected by a bar, all three offering a support zone for the fingers of the user's hand;

and that it is adapted for exercising a force on an element to be controlled when the handle (49) is grasped by the user's hand at one or another of the three gripping zones formed by the two arms (53) and the bar (54) of the body of the handle associated with the control element.

20 Claims, 5 Drawing Sheets

UNIVERSAL HANDLE AND BODY-SUPPORTING CHAIR UTILIZING SAME

The present invention relates to the handles used for transmitting a force to a device and which comprises control members capable of acting on safety systems integrated in the device to which the handle is adapted.

More particularly, the device relates to handles that provide their user with a plurality of grips such that they can be qualified as being universal.

In a preferred but non-limiting embodiment, the invention relates to such a handle utilized for maneuvering a verticalization system of a body support chair for physically challenged persons or invalids. This type of chair such as, for example, that described in patent FR 2 769 830, comprises a chassis supporting an articulated structure that comprises a seat as well as two symmetrical lateral articulated systems assuring verticalization—lowering function of the seat, the back and of the foot rest in order to make it possible for the user of the chair to move from a sitting position to a standing position.

For this purpose, each lateral articulated system comprises a first deformable quadrilateral contributing to the support of the seat and comprised of two sills, top and bottom, respectively, articulated on a front part of the chassis and connected at their rear part by a spacer part.

Each lateral articulated system comprises also a second deformable quadrilateral contributing to the support of the foot rest as well as a back assembly articulated on the first quadrilateral facing the second quadrilateral, by means of the spacer part, at least Finally, each articulated lateral system comprises a maneuvering assembly interposed between the first quadrilateral and the frame, which comprises on the one hand a first lever articulated on the rear part of the chassis and at the end of a second lever, whose other end is articulated on the first quadrilateral, as well as a maneuvering handle attached to the second lever and assuming the function of guidance and control of the relative pivoting of the lateral systems from one lowered position to a verticalization position of the structure relative to the chassis and vice versa.

The maneuvering assembly comprises, on the other hand, an element assisting in the raising—verticalization movement such as, for example, a pneumatic jack. In order to provide for easy gripping regardless of the articulated structure, the maneuvering handle provides a U-shaped gripping zone, open at its center, having two arms connected by a bar and all three offering a support back for the palm of the user's hand.

This type of body—support chair satisfies all of the requirements relating to its verticalization—lowering function as to the user who is capable of moving from a seated position to a standing position without assistance, human or mechanical, other than that provided by the pneumatic jack.

However, notwithstanding the satisfaction afforded by the considerable ease of moving into the two positions, standing and seated, it has been necessary, in order to enhance the perception of safety of the user who has completely lost the of his lower limbs, of using blocking means of the verticalization—lowering movement, which are capable of preventing an unintentional movement from the upright position to the seated position but which also makes possible stopping in an intermediate phase, between the seated position and the standing position in order to allow the user to regain his strength or even to adjust his posture, for example. In order to address this need, we propose, for example but not exclusively, using as a blocking means a pneumatic jack having automatic blocking controlled by means of a control member arranged on the handle, for example.

There was then the need of enabling the user to act upon said control member in all phases of the verticalization—lowering movement, regardless of the position of the maneuvering handle, and to do so rapidly and reflexedly.

In order to address this need, the invention relates to a universal handle comprising a handle part having a U-shaped gripping zone open at its center and having two arms connected by a bar, all three providing a support back for the palm of one hand or the fingers of a user.

According to the invention, said grip is characterized in that it comprises in addition a control member:

- which is arranged on the inside of the opening of the gripping zone of the body of the handle and open at its center in such a fashion as to comprise a U-shaped gripping zone corresponding to the gripping zone of the handle and having two arms connected by a bar, all three offering a support zone for the fingers of the user's hand;
- and that it is adapted for exercising a force on an element to be controlled when the handle is locked by the user's hand at the level of one or another of the three gripping zones formed by the two arms and the bar of the body of the handle associated with the control member.

Operation of said control member, integrated with the universal handle, thus makes it possible for the user to control the action of the control member or receiver in different gripping postures of the universal handle.

This advantageous feature of the invention can then be used advantageously in the context of a body-support chair, such as hereinbefore described, or even, in a handling cart which comprises an automatic braking system, blocking the rotation of the wheels upon release of the universal handle.

The control member can be realized in any suitable form and manner assuring its actuating function of an control or receiver element.

According to one preferred but not strictly necessary characteristic of embodiment of the invention, the control member comprises two swivel pins and the handle comprises, for each pin, a support surface adapted to enable pivoting of a control member when the handle is held in the hand at one or the other of the arms of the gripping zone. Preferably, the pivoting pins are then arranged facing the bar of the control member, it being understood that they can also be arranged on the same side as said latter.

According to another characteristic of the invention and when it is necessary to exert a traction on the control member, the control member comprises, facing the bar, an cross bar for fixation of the element to be controlled, which connects the two arms of the control member.

According to the invention, the control member can be adapted on or within the handle.

Thus, according to a preferred embodiment the body of the handle comprises an open chamber at the center of the gripping zone, on the inside of which the control member is arranged.

In a preferred but non-exclusive application, the universal handle according to the invention is used for maneuvering the mechanism of a body-support chair for the physically challenged or invalid.

Thus, the invention relates also such a chair comprising a frame supporting an articulated structure, which comprises a seat, a foot rest, a back and two symmetrical lateral articulated systems, each comprising:

- a first deformable polygon or quadrilateral contributing to the support of the seat, comprising two sills, upper and lower, respectively articulated on the front part of the frame and connected towards their rear parts by a spacer part.
- a second deformable polygon contributing to the support of the foot rest;
- a back assembly articulated on the first quadrilateral, opposite to the second polygon, by means of the spacer part, at least;
- and a maneuvering assembly interposed between the first quadrilateral and the frame, which comprises on the one hand a first lever articulated on the rear part of the frame and at the end of a second lever, whose other end is articulated on the first quadrilateral, as well as a maneuvering handle attached to the second lever and assuming the function of guidance and control of the relative pivoting of the lateral systems from a lowered position to a verticalization position of the structure relative to the chassis and vice versa.

According to the invention, this body-supporting chair is characterized in that it comprises a means for blocking of the verticalization—lowering movement and in that the maneuvering handle of at least one of the lateral assemblies comprises a universal handle, whose control member acts on the means for blocking of the verticalization—lowering movement.

According to a preferred embodiment, the blocking means are integrated with a member for assisting the movement of verticalization—lowering which equips each articulated system.

The assistance members can be realized in any suitable fashion such as, for example, in the form of a mechanism common to the two articulated systems and using an electrically operated geared motor. According to one preferred embodiment, each assistance member comprises an automatic gas actuated blocking jack interposed between the first quadrilateral of the corresponding lateral articulated system and the front part of the frame. In one preferred but non-exclusive embodiment of the invention, in order to avoid any unintentional triggering of the assistance means or even any unintentional unblocking of the movement, the body of the universal handle is fitted onto a support attached to the second lever in such a fashion as to be moveable between a resting position, wherein the action of the control member is neutralized and a working position, wherein the control member is capable of acting on the means for blocking the verticalization movement.

Preferably, this movement corresponds to a rotation on a plane that is substantially vertical and the body of the handle is then moveable relative to the support in rotation along a substantially horizontal axis included in a frontal plane.

Advantageously, this movement makes it possible to correspond the resting position of the handle when the chair is in a lowered position to a fender or guard, wherein the handle is interposed between the seat and the corresponding wheel of the chair.

Preferably, the second maneuvering handle, even if it does not comprise a control member, is also arranged on its lever so as to be moveable in such a fashion as to be able to occupy two positions similar to those of the universal handle.

Preferably, the universal handle and the second maneuvering handle thus comprise locking means in the one or the other of their positions.

According to another feature of the invention, in order to be able to adapt the body-support chair to the morphology of its user in order to provide optimum comfort and assure the ergonomy of the verticalization—lowering system, the body of the universal handle is arranged on a support, whose position is adjustable between the two ends of the second lever. This adjustment can then be realized in any suitable fashion and, preferably, by a series of fastening holes made in the second lever and using which the universal handle support can be arranged in the desired position. Utilization of such holes makes it possible to assure attachment that is resistant to the forces applied on the universal handle particularly at the time of the verticalization movement.

Diverse other characteristics of the invention will become obvious from the description that follows made in relation to the annexed drawings which represent one preferred non-limiting embodiment of a universal handle according to the invention as well as a body support chair utilizing such a universal handle.

Figure 1:
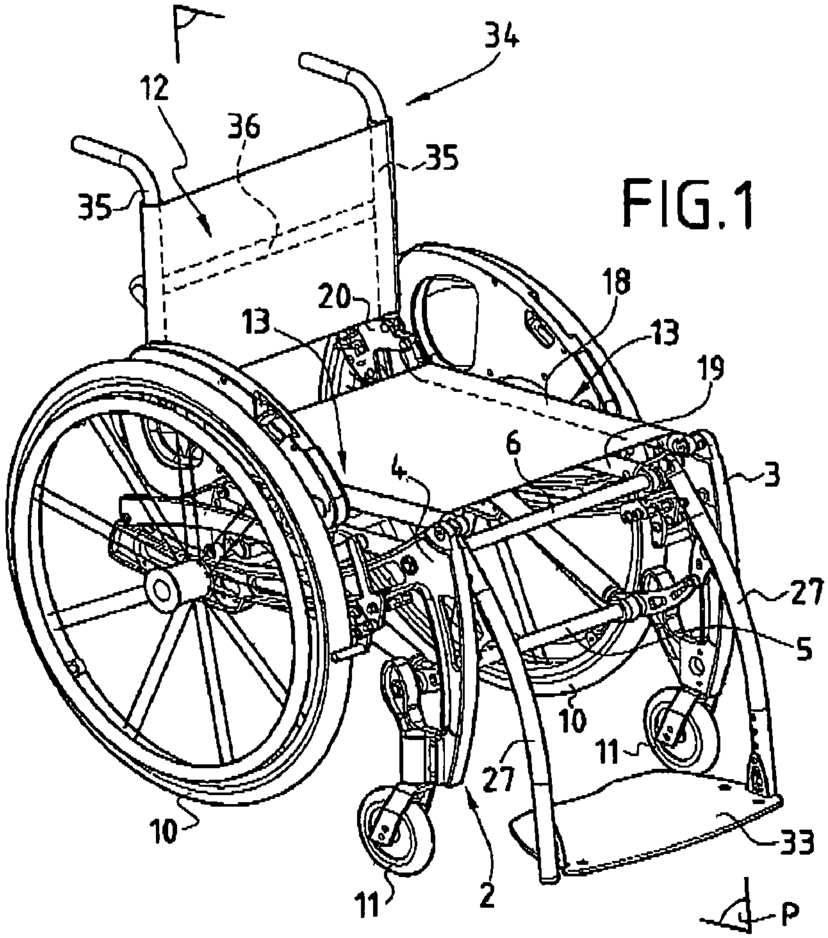
FIG. 1 represents a perspective view of a body support wheel chair utilizing a universal handle according to the invention.
Figure 2:
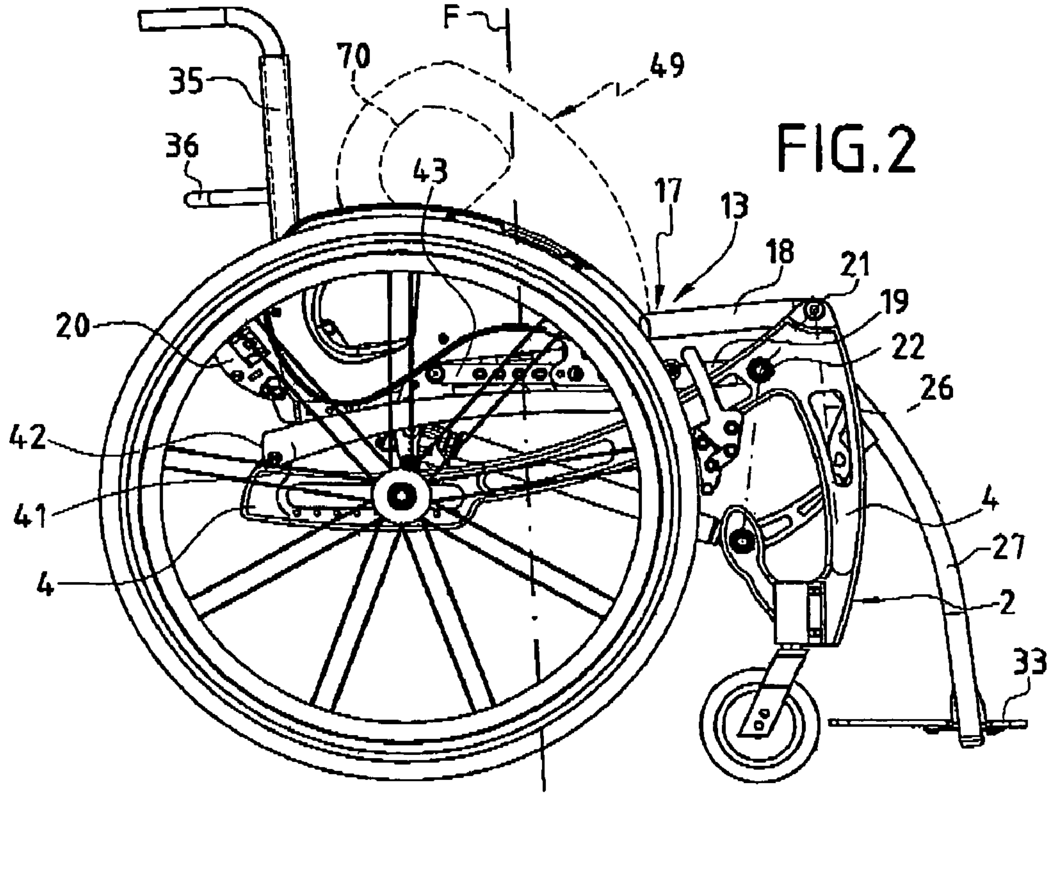
FIG. 2 is an elevation in right-sided view of the chair illustrated in FIG. 1 in the lowered sitting position of the chair.
Figure 3:
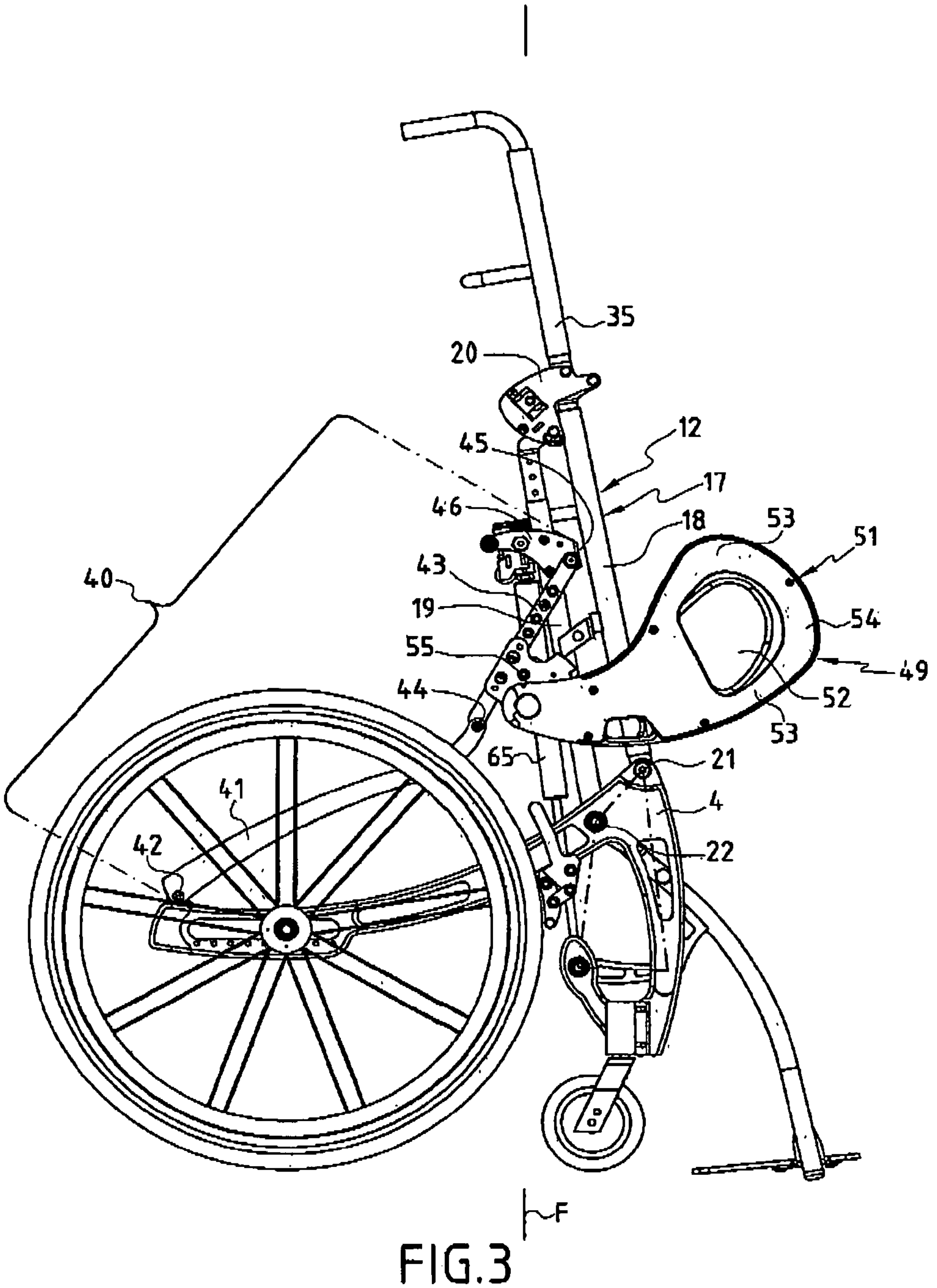
FIG. 3 is a partial elevation, similar to FIG. 2, of the chair in the verticalization or upright position.

In one preferred but non-exclusive application, the universal handle 1 according to the invention is intended to be used on a body-support wheel chair as illustrated in FIG. 1 to 3.

This type of chair comprises a frame, comprised of lateral hemi-frames 3 and 4, connected together by cross-members 5 and 6. These different constituent elements define a supporting assembly provided with driving wheels 10 and orientable steering wheels 11.

As illustrated, the frame 2 corresponds to a rigid design chair but it is quite obvious that a substantially similar conformation could be used for a foldable chair. In fact, in such a case, the rigid cross-members 5 and 6 are then replaced by flexible elements of known design.

The frame 2 described hereinbefore is equipped with a verticalizer device, which is realized in the form of an articulated structure 12 supported by the frame 2. The articulated structure 12 is comprised by two symmetrical lateral articulated systems symmetrical relative to a sagittal plane P and which are more particularly visible in FIGS. 2 and 3. Each articulated system 13 is intended to be attached laterally to the frame 2 at each of the hemi-frames 3 and 4, for example.

Each articulated system 13 comprises a first deformable quadrilateral 17 comprised of two sills 18 and 19, respectively called top and bottom, although they are not—in the representation shown in FIG. 3—disposed in the same vertical plane. The sills 18 and 19 are connected at their rear end part by an spacer element or spacer part 20 and are mounted on the frame 2 in the vicinity of the front part of said latter by a first articulation point 21 relating to the top sill and by a second articulation point 22 relating to the bottom sill. In the present case, the point of articulation 21 is provided in the top part of the corresponding hemi-frame 3, 4 while the point of articulation 22 is situated on this same hemi-frame behind and below the point of articulation 21.

In the illustrated example, the spacer element 20 is provided to correspond to the to the distance separating the points of articulation 21 and 22 such that the quadrilateral 17 presents preferred form of a deformable parallelogram.

Each articulated system 13 comprises in addition a second deformable polygon 26, in this instance a quadrilateral drawn in FIG. 2 and 3 in broken lines, connecting the first deformable quadrilateral to a jamb or similar riser 27 intended for supporting, alone or in combination with a jamb or similar riser, a foot rest 33.

Finally, each articulated system 13 comprises a back assembly comprising two uprights 35, each of these articulated on the first quadrilateral 13 opposite to the second quadrilateral 26 by means of the spacer part 20. According to the example illustrated, the uprights 35 of the back are in addition connected by a cross-member 36.

In order to allow passage of the articulated structure 12 from the sitting lowered position—as shown in FIG. 2—to the verticalization or standing position—as illustrated in FIG. 3—each articulated system comprises a maneuvering assembly 40 interposed between the first quadrilateral 17 and the frame 2 and, more particularly, the corresponding hemi-frame 4.

Each maneuvering assembly 40 comprises a first lever 41 articulated on the rear part of the frame by means of a pivot 42 and, at the end of a second lever 43, by means of a pivot 44. The other end of the second lever 43 is thus articulated on the first quadrilateral and, according to the example shown, on the bottom sill 19 by means of a pivot 45 and a fixation part 46 attached to the second lever 43.

Each maneuvering assembly comprises also a maneuvering handle 49, which could be made universal to the extent that it must allow the user of the chair to apply a force on said handle, both in terms of the lowered or sitting position shown in FIG. 2 and in terms of the verticalization B shown in FIG. 3 and during the transition or verticalization—lowering movement.

Figure 4:
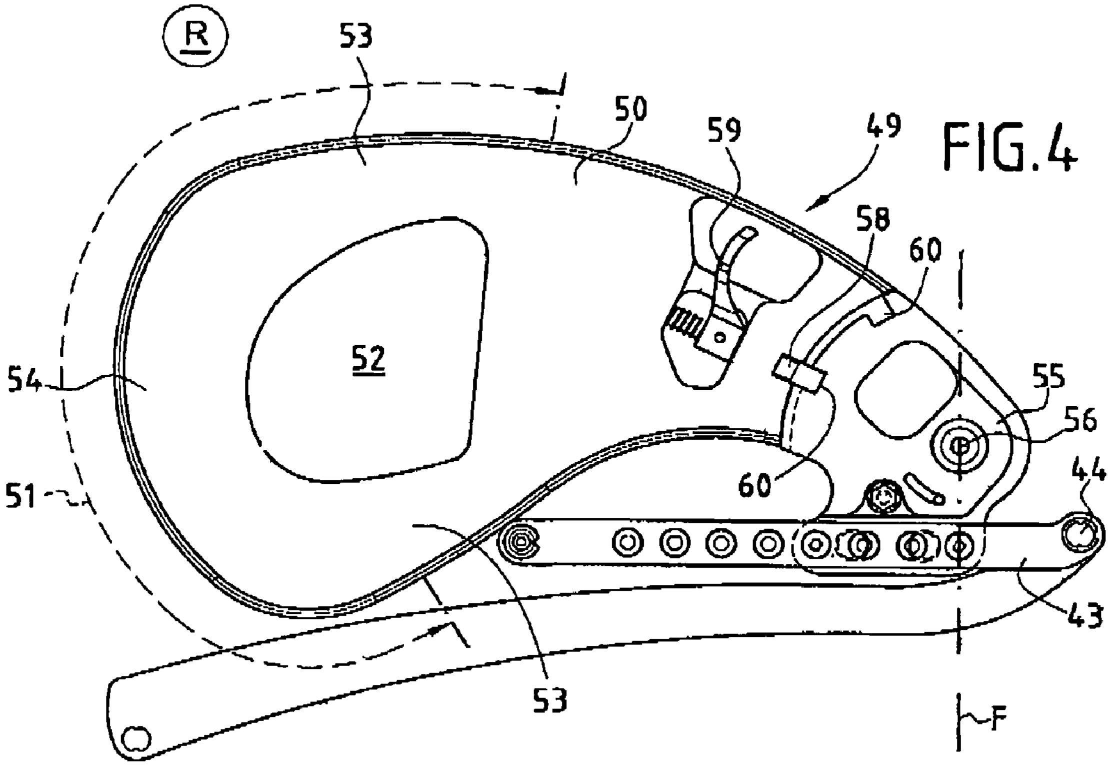
FIGS. 4 and 5 are elevations of a detail of an embodiment of the operating handle of the chair illustrated in FIG. 1.
Figure 6:
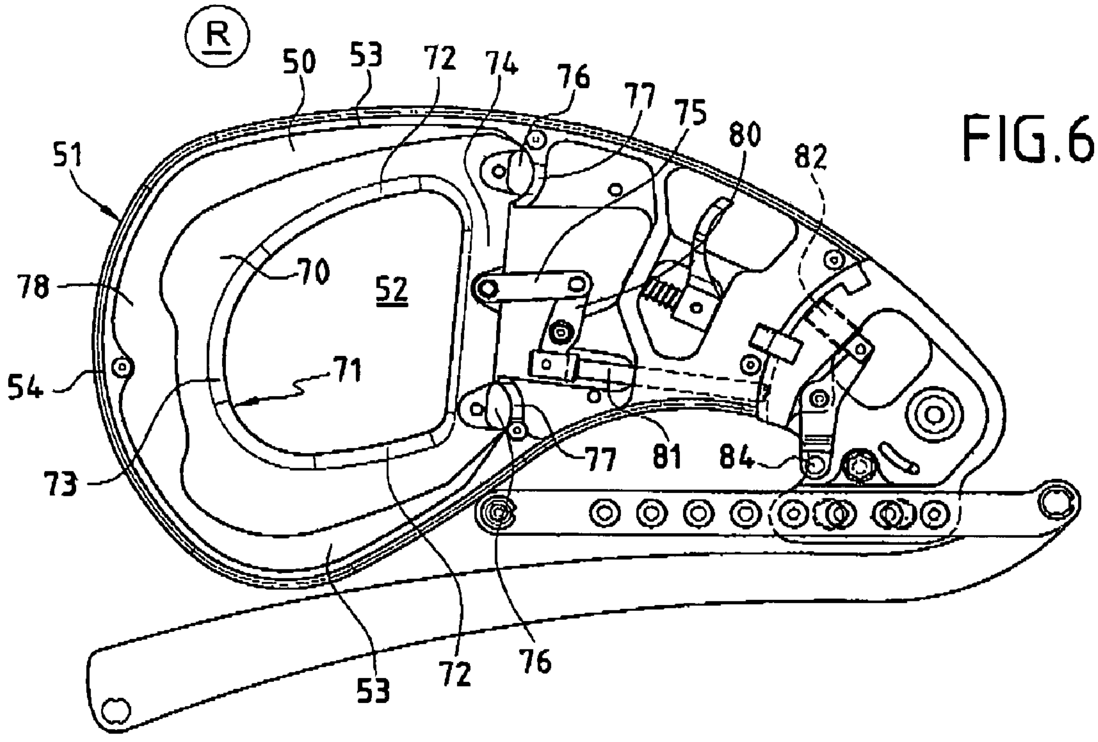
FIGS. 6 to 9 are elevations, partially cutaway, of a universal handle according to the invention.

To this end, each universal handle comprises, as shown more exactly in FIGS. 4 and 6, a handle body 50, having a gripping zone 51 shaped like a U and open in its center. Thus, the gripping zone 51 has to arms 53 connected by a bar 54. The arms 53 and the bar 54 thus provided, all three, a support back for the palm of the hand of the user who can furthermore enclose the handle by placing the fingers at its center 52.

Figure 5:
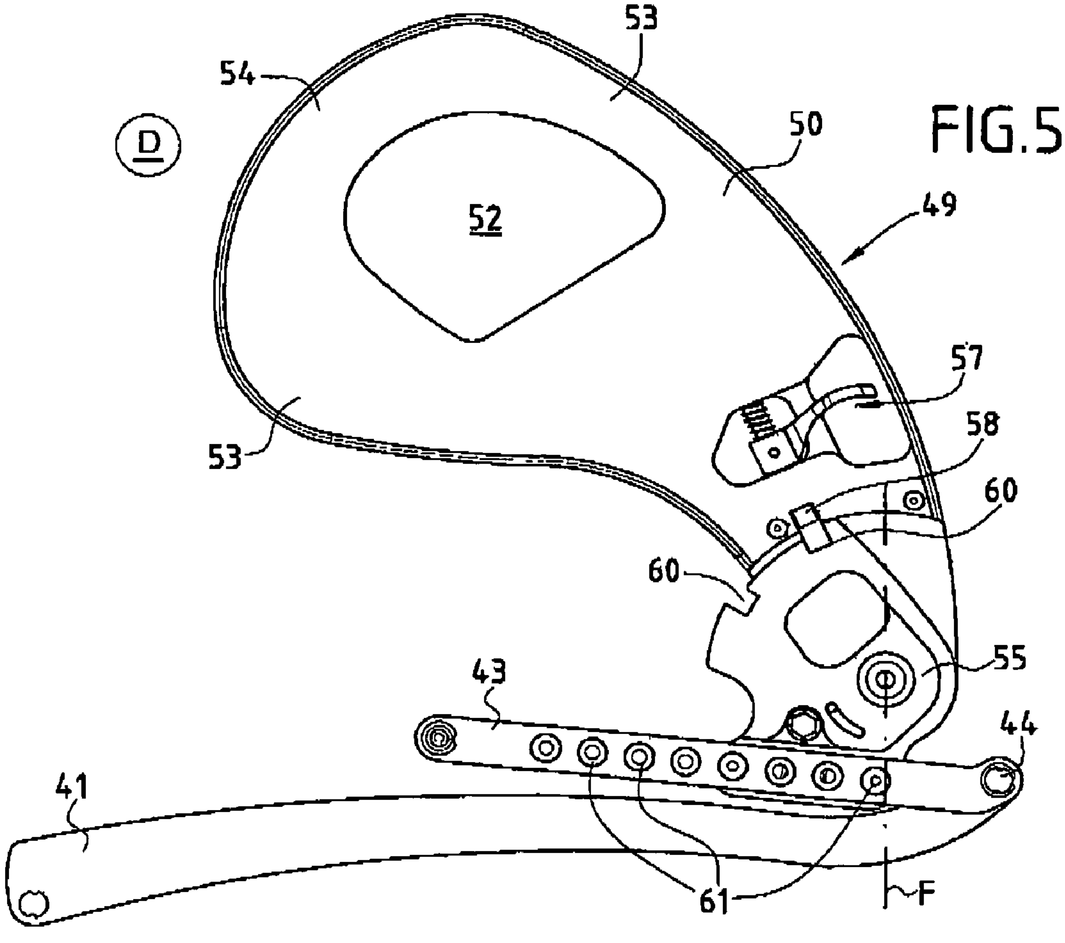

The body of the handle 50 is attached to the lever 43 as hereinbefore described by being affixed or moveable relative to said latter. According to the illustrated example, the body of the handle 50 is attached on the second lever 43 by means of a support 55 so as to be moveable between a resting or flat position R—as shown in FIGS. 1, 2, and 4 in solid lines—and a deployed or working position D—as illustrated in dotted lines in FIG. 2 and in solid lines in FIG. 5. To this end, the body of the handle 50 is connected to the support 55 by a swivel 56 having a substantially horizontal axis and contained in a frontal plane F, perpendicular to the sagittal plane P.

The possibility of movement, alternating from the retracted or resting position R shown to the raised or working position D of the handle, makes it possible to disengage the lateral space of the user upon any movement of the articulated structure is undesirable, both in the sitting position and in the verticalization or standing position.

In order to assure the stability of the working position D or resting position R of the maneuvering handle 50, said latter is equipped with means 57 for locking the handle into the one or the other of its positions R or D. The means 57 can be realized in any suitable fashion and are—according to the example shown—comprised of a finger 58 maneuvered into position by a gate 59 and intended to be inserted, depending on its position into the one or the other of two holes 60 made in the support 55.

In addition, it should be noted that, according to the example shown, in order to make possible a perfect fit of the chair to the morphology of its user, the support 55 of the maneuvering handle 50 is adjustable as to its position on the second lever, so as to be placed at different intermediary positions between the two ends of said lever 43.

To this end, according to the illustrated example, the adjustment is assured by means of a series of holes 61 made in the lever 2 and making it possible to fix, by means of screws (not shown) the support 55 at different positions such that it is possible to extend or to contract it from the back as a function of the morphology of the patient.

In order to facilitate the verticalization—lowering movement, the body support chair Described hereinbefore comprises also assistance means 65. According to this example, said assistance means are comprised for each of the articulated systems of a gas jack interposed between the first quadrilateral 13 and the front part of the frame 2.

According to the illustrated example, each gas jack 65 incorporates also automatic blocking means which prevent any movement of the jack and thus of the articulated system to which it is connected, whilst an unblocking control is not applied to the blocking system of the blocking of the jack. Thus, it is necessary to provide the user of the chair with control means that are easy to use. This is precisely the object of the universal handle according to the invention.

According to an essential characteristic of the invention, one at least of the two handles, preferably the one corresponding to the dominant hand of the user, comprises, as shown in FIG. 6 to 9, a control member 70 which is arranged on the inside of the central opening 52 of the gripping zone of the body of the handle 50 and open at its center. Thus, the control member 70 comprises at its center an interior gripping zone shaped like a U 71 and corresponding to the gripping zone 51 which could be placed outside of the handle body 50 and having two arms 72 connected by a bar 73. The arms 72 and the bar 73 thus provide, all three, a zone of support for the fingers of the corresponding hand of the user.

According to the example shown, the control member 70 has, opposite to the bar 73, a cross-member 74 intended to make possible the fixation of an element to be controlled 75, which will be described in more detail below.

The control member 70 comprises, opposite to the bar and at either end of the cross-member, two pivot pins 76, with which two support surfaces 77 offered by the handle body 50 are associated. Thus, the control member 70 is enclosed in part at the inside of the body 50 of the handle; only its gripping zone 71 being accessible from the outside of the handle t its central opening 52.

Figure 7:
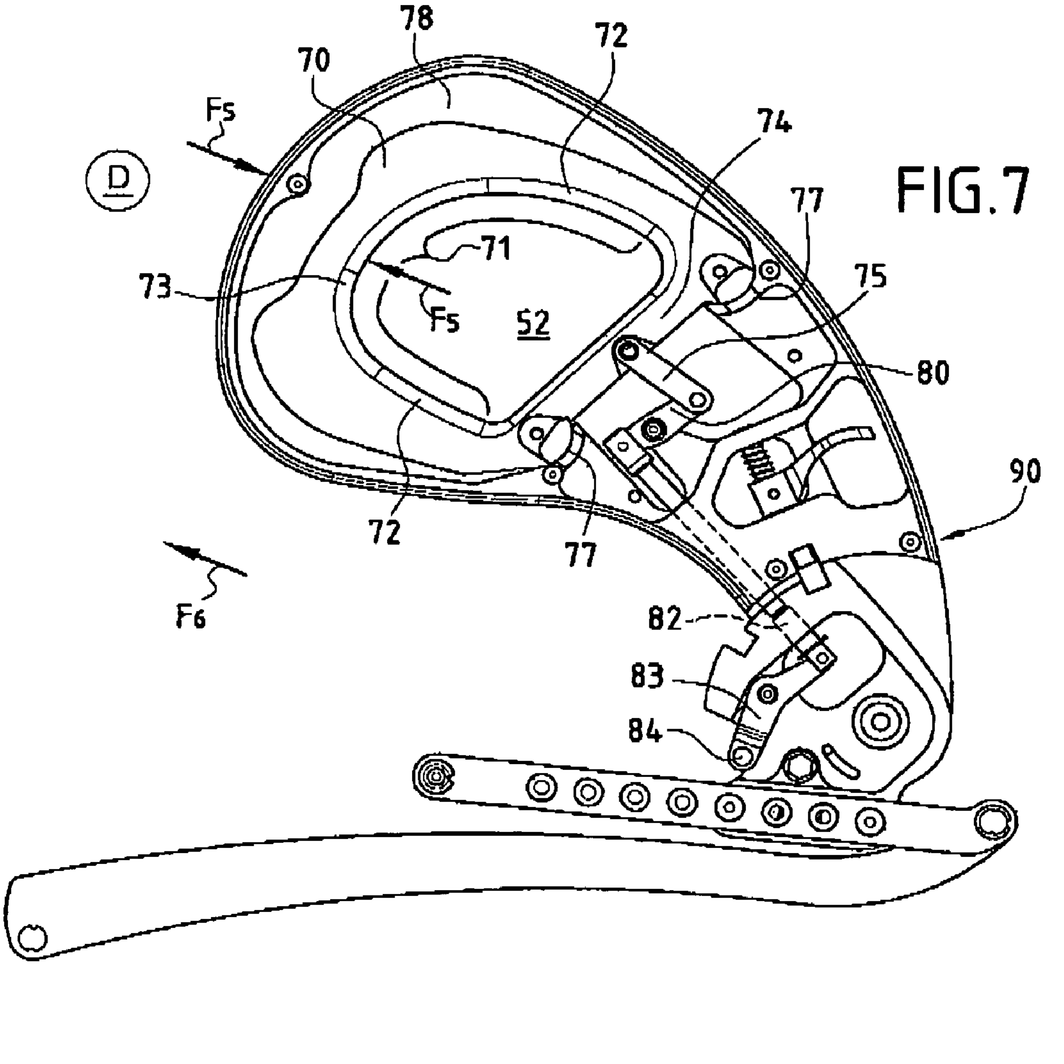

According to the illustrated example, the element to be controlled 75 is a rod connected by a pivot to an end of a spacer 80, whose other extremity acts on a linkage 81. Said linkage 81 is situated, when the body of the handle 50 is in the working position D (as shown in FIGS. 7, 8 and 9) facing a pusher 82 likewise affixed to one end of a spacer 83 whose other end is intended to be connected to a cable control device (not shown) either by being affixed to the cable itself of to the protective sheath, the cable control device then acting on the blocking means of the gas jack.

Considering the chain of movement transformation described above, it is necessary to exert a traction on the element to be controlled or the rod 75 in order to obtain an unblocking of the movement of the gas jacks. Now, the particular conformation of the control member 70 as well as, according to the illustrated example, the operation of the pivot pins 76 associated with the corresponding support surfaces 77, makes it possible to exert such traction regardless of the site where the universal handle is taken into the hand at the one or the other of the three gripping5 zones defined by the bar and the arms of the body of the handle 50 and the control member 70.

Figure 8:
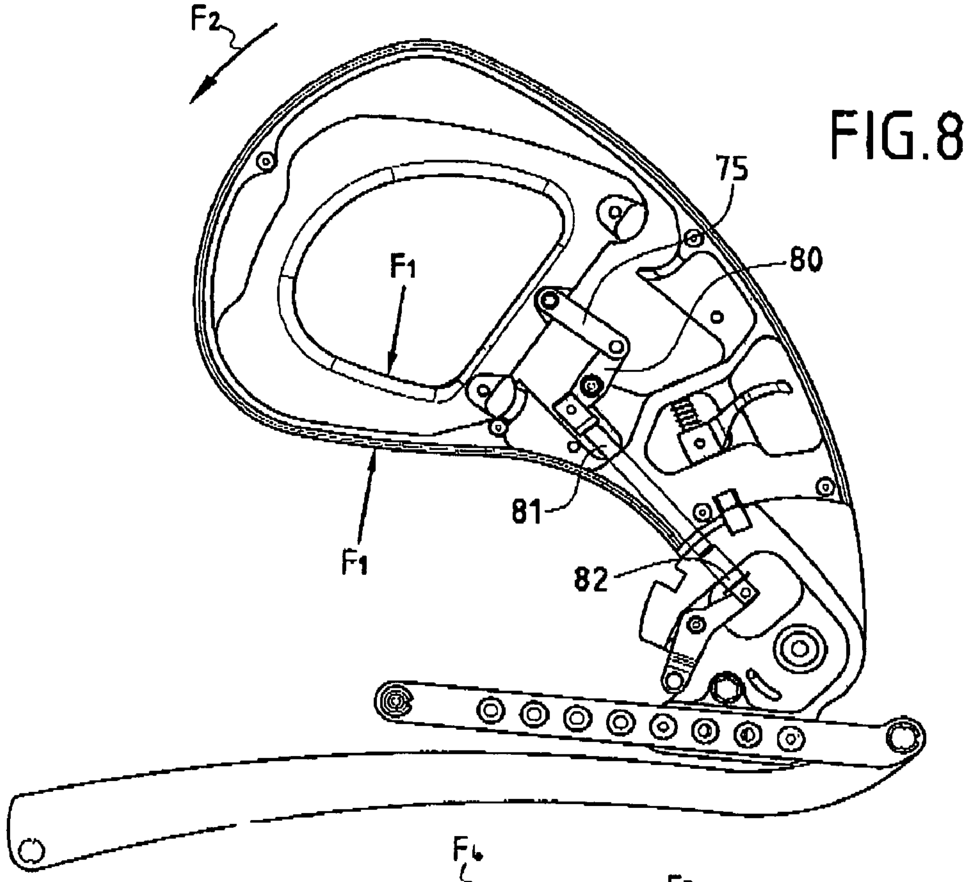

In fact, as shown more particularly in FIG. 8, when the handle is gripped at the lower arm 72 of the gripping zone and a force is exercised on the command member in the direction of the arrows $F_1$, the bottom support pin 76 abuts on the corresponding surface 77, thus entailing a pivoting of the control member 70 in the direction of the arrow $F_2$ and thus a traction on the element to be controlled 75.

Figure 9:
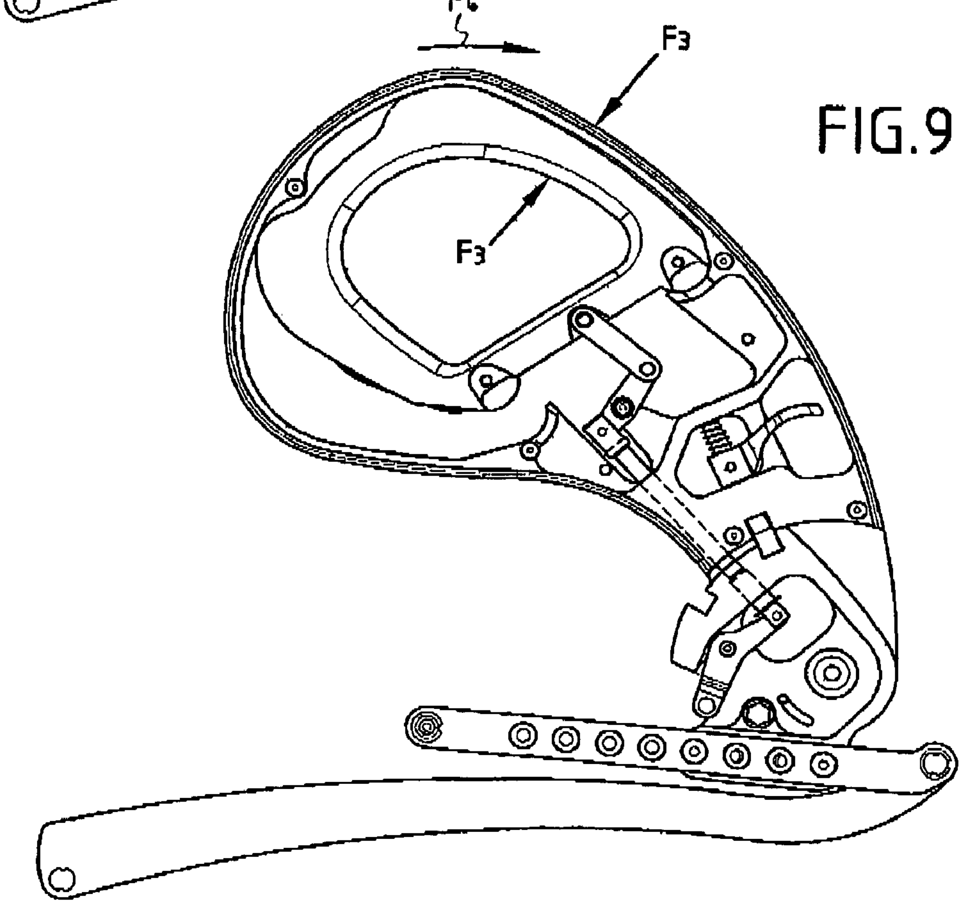

In like fashion and as shown in FIG. 9, a gripping at the level of the upper arm of the gripping zone with application of a force in direction of the arrows $F_3$ entails a pivoting of the control member 70 in the direction of the arrow $F_4$, said pivoting assuring also a traction of the element to be controlled 75.

Finally, when a force is exercised on the bar of the gripping zone in the direction of the arrows $F_5$ it assures a translation in the direction of the arrow $F_6$ of the control member 709 which obviously effects a traction of the element to be controlled.

Thus, regardless of the zone where the user grasps the handle 49, it is possible for him to easily control the unblocking of the gas jacks 65, either to assure a verticalization movement or, in contrast, to return to the sitting position. It should be noted that if the user releases the control member 70 in the course of the maneuvering, the automatic blocking makes it possible to immediately stop the e movement, thus providing the user with a level of comfort and a sense of increased security. In addition, that also makes it possible for him to stop in intermediate positions as a function of his needs.

Moreover, it should be noted that, according to the configuration illustrated, the movement of the maneuvering handle 49 between its working position and its resting position R is taken advantage of for assuring a coupling of the control system. In fact, to the extent where in the resting position and as shown more particularly in FIG. 6, the push bar 81 is not facing the finger 82, an action on the control member 70 is without effect on the movement blocking means such that it is not possible to entail an unintentional unblocking of the movement, which contributes to the safety of the user. In fact, an unintentional unblocking, especially in the sitting position, could entail a verticalization of the user considering the power of the pneumatic jack, when such action is not desired.

It should be noted that, according to the example illustrated, the member assisting the movement is a pneumatic system. However, it could be an electrical system that the control member could control either directly or indirectly by means of the linkage described hereinbefore, in order to conserve the coupling function.

In like fashion, a control member 70 using the two handles 49 of the chair could be envisaged so that the user could, indifferently, proceed with unblocking of the verticalization—lowering movement by means of his right hand or his left hand.

Likewise, according to the illustrated example, the control member is adapted for exercising a traction on the element to be controlled or the receiver but it could also be adapted for exercising a pressure on said latter.

Furthermore, according to the example described hereinbefore, the control member is situated in part on the outside of the body of the handle; however, it could nonetheless be situated on the exterior of said latter by being placed at the central opening 52.

Naturally, diverse other modifications could be made without departing from the scope of the present invention.

The invention claimed is:

1. A universal handle comprising:

a handle body having a U-shaped gripping zone, open at its center, having two arms connected by a bar, providing a support back for the palm of the hand or the fingers of a user; and a control member which is arranged on an inside portion of the opening of the gripping zone of the body of the handle and open at its center so as to comprise a U-shaped gripping zone corresponding to the gripping zone of the handle and having two arms connected by a bar, the arms and the bar offering a support zone for fingers of the user's hand, the control member being adapted for exerting a force on an element to be controlled when the handle is locked by the user's hand at the level of one of the gripping zones formed by the two arms and the bar of the body of the handle associated with the control member, wherein the control member comprises, opposite the bar, a cross-member for fixing the element to be controlled, the cross-member being connected to the two arms of the control member and adapted for exercising traction on the element to be controlled.

2. The universal handle according to claim 1, wherein:

the control member comprises two pivot pins, and the body of the handle comprises, for each said pivot pin, one support surface adapted for allowing a pivoting of the control member when the handle is grasped at one of the arms of the gripping zones.

3. The universal handle according to claim 2, wherein the pivot pins are situated opposite to the bar of the control member.

4. The universal handle according to claim 1, wherein the body of the handle comprises an open chamber at the center of the gripping zone, the control member being arranged at an inside portion thereof.

5. A body support chair for physically challenged persons or invalids comprising a frame supporting an articulated structure, which comprises a seat, a foot rest, a back and two symmetrical lateral articulated systems, each said system comprising:

a first deformable polygon for supporting the seat, comprising upper and lower sills, respectively articulated on the front part of the frame and connected towards their rear parts by a spacer part;

a support of the foot rest;

a back assembly articulated on the first polygon opposite to the foot rest by means of the spacer part;

a maneuvering assembly interposed between the first polygon and the frame, which comprises a first lever articulated on the rear part of the frame and at the end of a second lever, having an opposite end articulated on the first polygon, as well as a maneuvering handle attached to the second lever and assuming the function of guidance and control of the relative pivoting of the lateral systems from a lowered position to a verticalization position of the structure relative to the chassis and vice versa, and means for blocking of the verticalization—lowering movement;

the maneuvering handle of at least one of the lateral assemblies comprising a universal handle which comprises:

a handle body having a U-shaped gripping zone, open at a center portion thereof and having two arms connected by a bar providing a support back for the palm of the hand or the fingers of a user; and a control member which is arranged on the inside of the opening of the gripping zone of the body of the handle and open at its center so as to comprise a U-shaped gripping zone corresponding to the gripping zone of the handle and having two arms connected by a bar, the arms and the bar offering a support zone for the fingers of the user's hand;

the control member being adapted for acting on the means for blocking the verticalization—lowering movement when the handle is locked by the user's hand at the level of one or another of the gripping zones formed by the two arms and the bar of the body of the handle associated with the control member.

6. The body support chair according to claim 5, wherein the blocking means are integrated into a member assisting the verticalization—lowering movement, which equips each articulated system.

7. The body support chair according to claim 6, wherein each assistance member comprises a gas jack with automatic blocking interposed between the first quadrilateral and the front part of the frame.

8. The body support chair according to claim 5, wherein the body of the universal handle is adapted to a support attached to the second lever so as to be moveable between a resting position, in which the action of the control member is neutralized and a working position, in which the control member is susceptible to acting on the means for blocking the verticalization—lowering movement.

9. The body support chair according to claim 8, wherein the handle body is mobile relative to the support in rotation along a substantially horizontal axis included in a frontal plane.

10. The body support chair according to claim 8, additionally comprising a means for locking of the universal handle in one of its positions.

11. The body support chair according to claim 8, wherein the maneuvering handle of a second lateral assembly is mobile so as to be able to occupy two positions.

12. The body support chair according to claim 11, additionally comprising means for locking of the second maneuvering handle in one of its two positions.

13. The body support chair according to claim 5, wherein the body of the universal handle is adapted on a support, having a position adjustable between the two ends of the second lever.

14. The body support chair according to claim 13, additionally comprising a series of fixation holes arranged in the second lever as means for adjusting the position of the support.

15. The body support chair according to claim 5, wherein the control member of the universal handle comprises two pivot pins, and wherein the body of the handle comprises, for each said pivot pin, one support surface adapted for allowing a pivoting of the control member when the handle is grasped at one or the other of the arms of the gripping zones.

16. The body support chair according to claim 15, wherein the pivot pins are situated opposite to the bar of the control member.

17. The body support chair according to claim 5, wherein the control member comprises, opposite the bar, a cross-member for fixing the element to be controlled, the cross-member connected to the two arms of the control member and adapted for exercising a traction on the element to be controlled.

18. The body support chair according to claim 5, wherein the body of the universal handle comprises an open chamber at the center of the gripping zone and at the inside of which the control member is arranged.

19. The body support chair according to claim 5, wherein the control member of the universal handle is adapted for exercising a traction on the control member.

20. The body support chair according to claim 5, wherein each articulated system comprises a second deformable polygon contributing to the support of the foot rest.

* * * * *